A. J. FROGUE & M. A. WEBER.
SPRING WHEEL.
APPLICATION FILED DEC. 27, 1909.
973,769.
Patented Oct. 25, 1910.
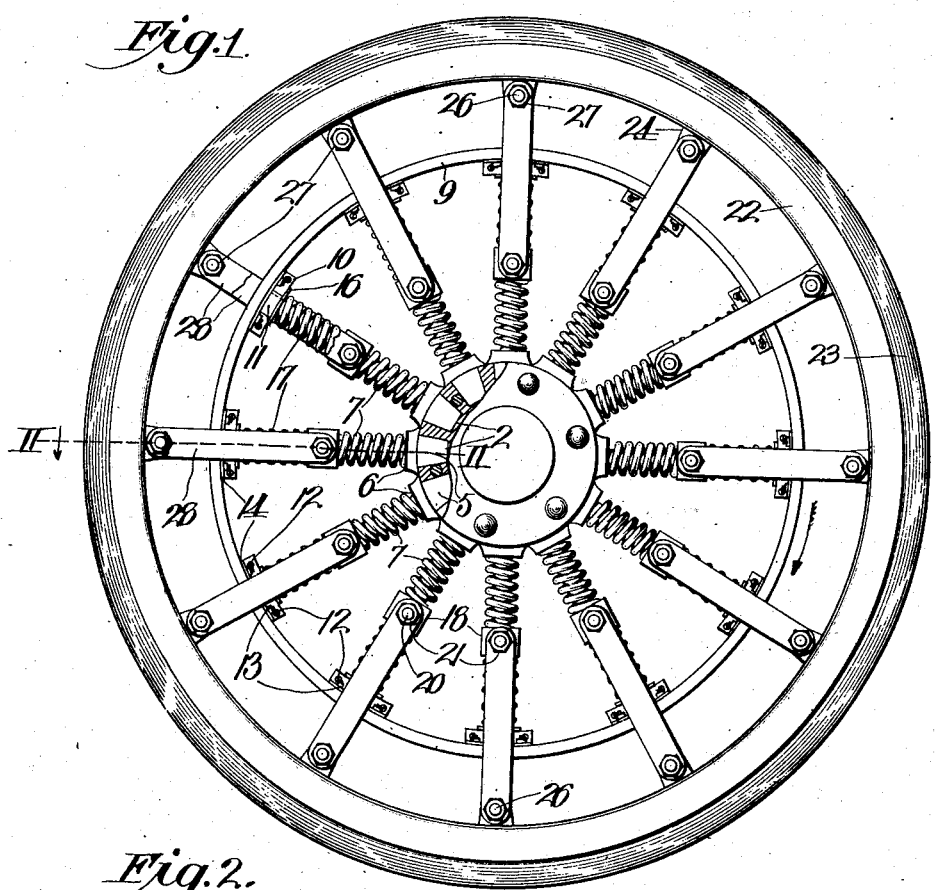
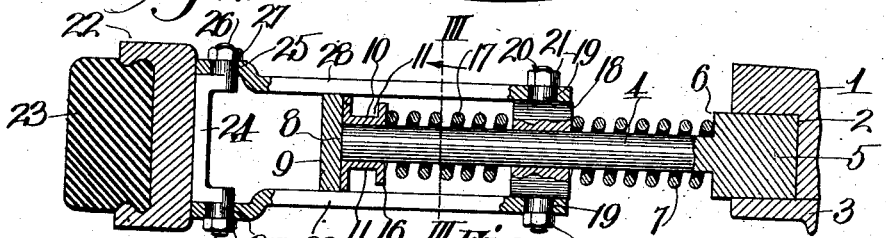
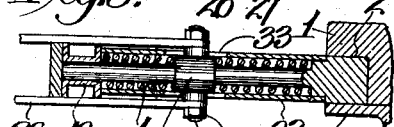
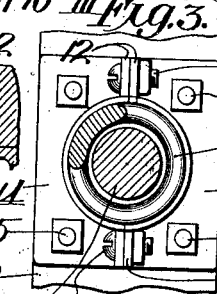
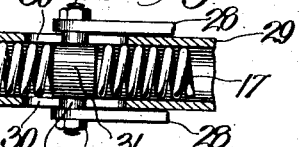
Witnesses
Frank R. Horr
H. C. Rodgers
Inventors:
A. J. Frogue & M. A. Weber
By George Y. Thorpe Atty.

UNITED STATES PATENT OFFICE.

ARTHUR J. FROGUE, OF KANSAS CITY, MISSOURI, AND MATHIAS A. WEBER, OF LA CROSSE, WISCONSIN.

SPRING-WHEEL.

973,769.  Specification of Letters Patent.  Patented Oct. 25, 1910.

Application filed December 27, 1909. Serial No. 535,102.

*To all whom it may concern:*

Be it known that we, ARTHUR J. FROGUE and MATHIAS A. WEBER, citizens of the United States, residing at, respectively, Kansas City, in the county of Jackson and State of Missouri, and La Crosse, county of La Crosse, State of Wisconsin, have invented certain new and useful Improvements in Spring-Wheels, of which the following is a specification.

This invention relates to spring wheels and more especially to spring wheels of that type embodying an inner member and an outer member surrounding the same and springs tending to hold the inner member centrally within the outer member, and our object is to produce a wheel of this character which is stiff and rigid as regards lateral movement so as to be proof against buckling and which is equipped with a solid tire, not susceptible of being punctured like a pneumatic tire.

A further object is to produce a spring wheel having spokes which can be easily and quickly placed in or removed from position, one at a time, and which is provided with two sets of springs, one set of which tends to resist independent turning movement of the inner member and both sets of which coöperate together in holding the inner member centrally within the outer member.

With these general objects in view and others as hereinafter appear, the invention consists in certain novel and peculiar features of construction and organization as hereinafter described and claimed; and in order that it may be fully understood reference is to be had to the accompanying drawing, in which:

Figure 1, is a side elevation of a spring wheel embodying the invention, one of a series of links of said wheel being broken away to more clearly disclose one of the outer springs and the means by which the outer end of the companion spoke of the inner member is secured to the rim of such member, the hub cap being also broken away and the hub sectioned to disclose notches in the hub for the reception of the inner ends of said spokes. Fig. 2, is an enlarged section taken on the line II—II of Fig. 1. Fig. 3, is an enlarged section on the line III—III of Fig. 2. Fig. 4, is a longitudinal section of a modified construction of the spoke of the wheel. Fig. 5, is a similar view of a part of a spoke and a casing inclosing the same.

In the said drawing, 1 indicates the hub of the wheel provided with notches 2 in its outer face, the hub having the usual cap 3 bolted to it and forming the outer walls of said notches.

4 are spokes radiating from the hub and provided with squared inner ends or tenons 5 to be fitted sidewise into the notches 2 and to be held therein by the cap 3. Near their inner ends the spokes are provided with shoulders 6 as abutments for the inner ends of spiral springs 7 fitted on the spokes, the outer ends of the latter fitting in sockets 8 formed by the rim 9 and sleeves 10 secured to the inner side of said rim, the sleeves each consisting of a pair of semi-cylindrical necks 11 provided with outwardly-projecting flanges 12 bolted together as at 13, and base flanges 14 bolted as at 15 to the rim, and said sleeves are provided with outwardly-projecting flanges 16 at their inner ends, to provide abutments for the outer ends of helical springs 17 mounted on the spokes, the inner ends of said springs and the outer ends of springs 7 bearing against collars 18 slidingly mounted on the spokes and provided with outwardly-projecting trunnions, consisting of cylindrical portions 19 and reduced extensions 20, the latter being engaged by retaining nuts 21. Surrounding the rim 9 is the outer rim 22 of the wheel, provided peripherally with a rubber or equivalent cushion 23 and provided at its inner side with brackets 24 terminating in outwardly-projecting trunnions consisting of cylindrical portions 25 and reduced threaded-extensions 26, the latter being engaged by retaining nuts 27.

28 are links snugly embracing opposite sides of the rim 9, and pivoted at their inner ends and retained on the trunnions of the collars 18 by the nuts 21, and pivoted at their outer ends and retained on the trunnions of brackets 24, by nuts 27.

From the foregoing it will be apparent that any spoke may be easily and quickly removed from the wheel by removing the adjacent outer link 28, the hub cap 3, the nut 21 at the inner side of the collar of said spoke, and the outer section 11 of the sleeve 10 engaging said spoke, and that by reversing this operation the same spoke or a new one can be resecured in position.

When the wheel is at rest the links 28 will stand radially or substantially radially of the wheel, though if the weight of the body of the vehicle (not shown) is sufficient, the axis of the inner member of the wheel will be somewhat lower than the axis of the outer member, as the weight will be sufficient to cause the springs to yield slightly, it being noticed in this connection that the outer springs 17 above the axis and the inner springs 7 below the axis are the ones which sustain the weight of the body of the vehicle, though the outer springs which happen to be horizontal, will also coöperate in a slight degree in sustaining the body of the vehicle, because in the downward movement of the inner part of the wheel the substantially horizontal links 28 will tend to swing downward and outward at their inner ends and thus tend to pull the attached collars outward against the resistance of the adjacent outer springs. In the travel of the machine it will be apparent that the pressure imposed on the said sustaining springs will vary and that consequently the inner part of the wheel will vibrate in a vertical direction so as to absorb shocks and jars incident to the travel of the wheel over slight obstructions or irregularities in the roadway.

When the power tending to propel the machine is imposed on the rear wheels, the inner member of the wheel will turn in the direction indicated by the adjacent arrow, Fig. 1, before the outer member responds and moves in the same direction, and this advance movement of the inner member will be resisted by all of the outer springs 17, as in such advance movement the links 28 will swing upon their outer trunnions and thereby exert through the collars 18, compression on the outer springs, which will be sufficiently strong and stiff to yield but slightly before the outer member of the wheel begins to rotate. When the machine is arrested said outer springs will react and thus return the inner member of the wheel to its original position with respect to the outer member, and should the machine be backed the links 28 will swing in the reverse direction at their inner ends so that the outer springs oppose independent rotative movement of the inner member in both forward and retrograde movement.

It will be apparent by reason of the fact that the inner member of the wheel is capable of a slight rotary movement before transmitting such movement to the outer member, that the machine will start with less abruptness and hence with less possibility of injury to the engine and the means for transmitting motion from the engine to the rear wheels.

If desired the spokes may be tubular as shown at 29 in Fig. 4, and they will also be provided with longitudinal slots 30 through which the trunnions of partitions or plungers 31 will project, these partitions or plungers being located within the spokes and corresponding in function to collars 18, that is to say, they provide abutments for the outer ends of the inner springs and the inner ends of the outer springs. It will also be apparent that in the construction shown by Figs. 1 and 3 inclusive, the spokes, springs and collars may be inclosed by radial shelves 32 as shown in Fig. 5, the shelves being provided with longitudinal slots 33 through which the trunnions of the collars will project.

From the above description it will be apparent that we have produced a spring wheel embodying the features of advantage enumerated in the statement of the object of the invention, and which is susceptible of modification in various particulars without departing from the spirit and scope of the appended claims.

Having thus described the invention what we claim as new and desire to secure by Letters-Patent, is:

1. A spring wheel, comprising an inner member consisting of a hub, spokes radiating therefrom and a rim secured to and surrounding the spokes, an outer member surrounding the rim of the inner member, collars mounted slidingly on the spokes, springs mounted on the spokes and pressing outwardly against said collars, springs mounted on the spokes between the collars and rim and pressing inwardly on the collars, links embracing opposite sides of the rim of the inner member and pivoted at their inner ends to said collars and at their outer ends to said outer member, and sleeves inclosing the spokes, springs and collars and provided with longitudinal slots to accommodate the pivotal connections between said collars and the inner ends of said links.

2. A spring wheel, comprising a hub provided with peripheral sockets which open through its outer face, radiating spokes fitting at their inner ends in said sockets, a cap secured to the outer side of the hub and overlapping the ends of the spokes fitting in said sockets to hold them therein, a rim inclosing the spokes and concentrically surrounding the hub, radially-arranged sleeves at the inner side of the rim and each consisting of a pair of semi-cylindrical necks embracing between them the outer ends of the spokes, the outer members of the necks being removably secured to the inner members and to the rim, an outer member surrounding the rim of the inner member and provided with a tire, links pivoted to the outer member and embracing opposite sides of the first-named rim, means bearing a slidable relation to the spokes and pivoted to the inner ends of said links, and an inner and outer series of springs suitably supported, the inner series of springs pressing outwardly against the said means and the outer series of springs pressing inwardly against said means.

In testimony whereof we affix our signatures, in the presence of two witnesses.

ARTHUR J. FROGUE.
MATHIAS A. WEBER.

Witnesses:
   HELEN C. RODGERS,
   G. Y. THORPE.